United States Patent
Ni et al.

(10) Patent No.: US 9,315,613 B2
(45) Date of Patent: Apr. 19, 2016

(54) NONTEMPERATURE SENSITIVE MEMORY FOAM OF MDI SYSTEM SUITABLE FOR HORIZONTAL FOAMING PROCESS

(75) Inventors: Zhanggen Ni, Jiangsu (CN); Tao Lin, Jiangsu (CN)

(73) Assignee: JIANGSU HEALTHCARE CO., LTD., Jiangsu (CN)

( * ) Notice: Subject to any disclaimer, the term of this patent is extended or adjusted under 35 U.S.C. 154(b) by 0 days.

(21) Appl. No.: 13/824,031

(22) PCT Filed: Feb. 11, 2011

(86) PCT No.: PCT/CN2011/070935
§ 371 (c)(1),
(2), (4) Date: Mar. 15, 2013

(87) PCT Pub. No.: WO2012/106846
PCT Pub. Date: Aug. 16, 2012

(65) Prior Publication Data
US 2013/0190420 A1    Jul. 25, 2013

(51) Int. Cl.
| | |
|---|---|
| *C08G 18/48* | (2006.01) |
| *C08G 18/63* | (2006.01) |
| *C08G 18/76* | (2006.01) |
| *C08G 18/66* | (2006.01) |
| *C08G 18/18* | (2006.01) |
| *C08G 18/32* | (2006.01) |
| *C08G 18/40* | (2006.01) |
| *C08G 101/00* | (2006.01) |

(52) U.S. Cl.
CPC ........ *C08G 18/4812* (2013.01); *C08G 18/1808* (2013.01); *C08G 18/3203* (2013.01); *C08G 18/4072* (2013.01); *C08G 18/4825* (2013.01); *C08G 18/4829* (2013.01); *C08G 18/632* (2013.01); *C08G 18/667* (2013.01); *C08G 18/7664* (2013.01); *C08G 2101/0016* (2013.01); *C08G 2101/0083* (2013.01)

(58) Field of Classification Search
USPC ....................................................... 521/174
See application file for complete search history.

(56) References Cited

U.S. PATENT DOCUMENTS

| | | | | |
|---|---|---|---|---|
| 2007/0213420 | A1* | 9/2007 | Kimura ............. | C08G 18/3275 521/99 |
| 2010/0227938 | A1 | 9/2010 | Bauer et al. | |

FOREIGN PATENT DOCUMENTS

| | | |
|---|---|---|
| CN | 101016368 A | 8/2007 |
| CN | 101096408 A | 1/2008 |
| CN | 101157747 A | 4/2008 |
| CN | 101205288 A | 6/2008 |
| CN | 101240055 A | 8/2008 |
| CN | 101709106 A | 5/2010 |
| CN | 101709143 A | 5/2010 |

OTHER PUBLICATIONS

International Search Report dated Oct. 13, 2011,as issued in corresponding International Patent Application No. PCT/CN2011/070935, field Feb. 11, 2011 (with English translation—11 pages).
Official Action dated Dec. 19, 2013, issued by the Denmark Patent Office in corresponding Denmark Patent Application No. PA 2013-70018. (4 pages).
Office Action dated Jan. 14, 2016, issued by the Denmark Patent Office in related Denmark Patent Application No. PA 2013 70018-5 (3 pages).

* cited by examiner

*Primary Examiner* — Melissa Rioja
(74) *Attorney, Agent, or Firm* — Osha Liang LLP

(57) ABSTRACT

An MDI system non-temperature sensitive memory sponge suitable for a flat foam foaming process is made by using a polyol mixture, which includes a polyether polyol and a polymer polyol, to react with an isocyanate and an auxiliary agent mixture that includes: a chain extender, a foaming agent, a pore adjusting agent, and a catalyst. The polyether polyol includes a polyoxypropylene glycerol with a molecular weight of 700 and a polyoxypropylene trihydroxy ether with a molecular weight of 4800, the polymer polyol includes a graft polyether, and the isocyanate is methylene diphenyl diisocyanate.

8 Claims, No Drawings

NONTEMPERATURE SENSITIVE MEMORY FOAM OF MDI SYSTEM SUITABLE FOR HORIZONTAL FOAMING PROCESS

RELATED APPLICATIONS

This is the U.S. national stage application which claims priority under 35 U.S.C. §371 to International Patent Application No.: PCT/CN2011/070935 filed on Feb. 11, 2011, the disclosure of which is incorporated by to reference herein its entirety.

TECHNICAL FIELD

The present invention relates to an MDI (methylene diphenyl diisocyanate) system non-temperature sensitive memory sponge (foam) with a density of 40-70 D (Kg/m$^3$), in particular to a MDI system non-temperature sensitive memory sponge prepared by using a polyether polyol with a molecular weight of 700 and an isocyanate as the main materials (i.e., main reagents), and adding the additive auxiliary agents.

BACKGROUND TECHNOLOGY

With the improvement of living standards, comfort requirements of people on home furnishings are also getting higher and higher. Ordinary soft sponge products have always been widely adopted by furniture manufacturers because of their soft and elastic properties. However, in use, ordinary soft sponge products have disadvantages of high rebound pressure for human vascular, are hot in the summer, are hard in texture in the winter, and have poor comfort. Therefore, applications of the ordinary soft sponge are limited.

In order to compensate for the inadequacy of the ordinary soft sponge, a molding MDI system non-temperature sensitive memory sponge is introduced on the market. The memory sponge (foam) is capable of automatically adjusting its shape according to the body shapes and temperatures, effectively minimizing or eliminating the pressure to human bodies, offsetting the counter force, providing the most even and true support, allowing the body parts that are in long-term contact with the sponge to be in a state of no pressure, resulting in no hindrance of blood circulation and being less prone to producing fatigue and soreness. When non-temperature sensitive memory sponge is used in hospitals, it also can provide maximum comfort for the patients and can effectively prevent bedsores. The ordinary soft sponge can hardly compete with the superiority of non-temperature sensitive memory sponge.

However, the sponge has always been manufactured using an injection molding process. Using a mold as the carrier, one can only produce a sponge with a volume not greater than 0.5 m$^3$ each time. This process can only be used to produce small products, such as pillows and toys. This production process seriously hinders further expansion of applications of the non-temperature sensitive memory sponges (foams), and is not suitable for the production of large sponge products, such as mattresses. Furthermore, manufacturing using one mold at a time not only is unfit for large-scale productions, but also has a low efficiency.

SUMMARY OF INVENTION

The main object of the present invention is to provide an MDI system non-temperature sensitive memory sponge suitable for a flat foam foaming process. Particularly, the invention provides an MDI system non-temperature sensitive memory sponge with high tear strengths and better tensile rates, by adjusting the ingredients of the sponge system. These sponges are suitable for a flat foam foaming process.

In order to solve the above technical problems, an MDI system non-temperature sensitive memory sponge suitable for a flat foam foaming process of the present invention is made mainly by using a polyether polyol and a polymer polyol as the starting materials, then adding an isocyanate and additives/auxiliary agents: a foaming agent, a pore-adjusting agent, and a catalyst. Said polyether polyol is polyoxypropylene glycerol with a molecular weight of 700. Said polymer polyol is a highly active graft polyether. Said isocyanate is a modified methylene diphenyl diisocyanate. The process is characterized in that: polyoxypropylene trihydroxy ether with a molecular weight of 4800 is added to said polyether polyol, and a polyol chain extender is added to said auxiliary agents. In the above-mentioned composition, the total mass portions of the polyether polyol and the polymer polyol are 100 parts, the foaming agent is 1.5-3 mass parts, and the mass portions of isocyanate (M_isocyanate) are determined as follows: the mass part of the above-mentioned components that contain hydroxyl value are multiplied by the hydroxyl value of each component, followed by multiplying with the constant 0.155. The above-derived value is added to a value based on the foaming agent that does not contain hydroxyl value, wherein the value based on the foaming agent is calculated by mass parts of the foaming agent multiplied by a constant 9.665. Finally, the above-derived total number is multiplied by a hardness index to finally obtain the mass portions of the isocyanate.

Further, the amount of said polyoxypropylene trihydroxy ether with a molecular weight of 4800 added is 60-80% of the weight portions of the starting material polyols; the weight portions of the polyol chain extender are 2-5 parts of the weight portions of starting material polyols.

Further, said polyol chain extender is a polyether polyol with a molecular weight of 100, such as polyoxyethylene glycol.

The production principle of the present invention is: it is environmentally friendly to use environmentally friendly MDI instead of the traditional, dangerous chemical product TDI to produce gas sensing sponges. However, the gas sensing sponges foamed from MDI generally have relatively poor tear strengths. Therefore, it can only be used to make small sponge blocks using molds. This process cannot satisfy the need for large piece whole sponges, such as a mattress. In experiments, it was found that the resulting tear strengths are related to polyether polyol with a molecular weight of 4800. The reason why one cannot realize the production of a large foam is because when the original mold production ingredients are used in a flat foam process, the internal structure of the resulting sponge is hollow, similar to a column (pillar) structure with poor crosslinks and can be easily torn. In view of this phenomenon, the present invention improves the production ingredients of the traditional mold processes by adding a certain amount of a chain extender and adjusting the ratios of other components, such that the internal structures of sponges obtained from a large area flat foam foaming process are changed from cylindrical structures to mesh structures, increasing the internal crosslinks in the sponge internal structures. Therefore, this process meets the processing requirements of a large area whole-piece production process suitable for flat foam foaming.

In the present invention, due to the improvement in the ingredients, the sponge internal structures form meshes. When in use, the body heat can dissipate quickly along the sponge mesh structure, forming a "capillary" phenomenon.

Said phenomenon prevents the sponge interior from gathering outside heat, thereby increasing permeability and producing better comfort.

The advantages of the present invention include: in the MDI system sponges prepared using the above-mentioned ingredient, the high molecular weight polyether polyol, which was traditionally used as a pore adjusting agent, is used as a main material and supplemented with a chain extender in the present invention. This method can be used to produce large piece sponges on a flat foam foaming production line, breaking the limitations that the original MDI system gas sense sponge can only be used to produce small pieces sponges using a mould. Using production line operations and adopting the above-mentioned ingredients, the methods have the advantages of fast outputs and high efficiencies. The production speed is improved at least 100 times, as compared with the traditional MDI system gas sensing sponge injection molding process. Importantly, the production line does not require a different mold for each different shaped sponge. It is only necessary to cut the whole sponge, after production, into the required shapes using a cutting knife, thereby reducing the unnecessary mould cost.

DETAILED DESCRIPTION OF THE INVENTION

The materials for an MDI system non-temperature sensitive memory sponge with a density of 40-70 D ($Kg/m^3$) of the present invention include the following components and proportions: said production components and weight portions proportion are as follows: for 100 parts of polyols, isocyanate is 40-70 parts, the pore adjusting agent is 1.4-2.5 parts, the catalyst is 0.1-0.4 parts, the main water foaming agent is 1.5-2.5 parts, the auxiliary foaming agent methylene chloride is 0-10 parts; the polyol chain extender is 2-5 parts.

Said polyether glycol includes the polyether polyols with following weight portions: polyether polyol with molecular weight of 700: 10-20 parts; polyether polyol with molecular weight of 4800: 60-80 parts; and polymer polyol: 5-20 parts.

The above-mentioned polyol chain extender is polyoxyethylene glycol of polyether polyol with a molecular weight of 100.

After the above-mentioned materials are chosen, each material according to the percentage is separately put in each container, and the temperatures of all the raw materials are maintained at 22-25° C. for subsequent productions.

After the materials are prepared, the materials are subsequently mixed. Material mixing steps include: separately connecting each of the above containers through a pipeline to a mixer, wherein a measuring rod and an electromagnetic valve at each of several pipe entrances; the material is flowed out of each container by opening the electromagnetic valve and precisely controlling the flow rate by using the metering rod; flowing materials to the mixer; mixing in the mixer until the solution mixes evenly. The mixed solution is injected into a distributor through a spray nozzle connected to the mixer, The solution is distributed, using the distributor, evenly on the track in the production line oven with a flow rate of 150-320 kg/min. The oven temperature is 30-40° C. The mixed solution moves with a speed of 0.05-0.09 m/sec in the oven to effect continuous foaming. The track moves continuously to push the produced foam forward and to make room for the subsequent foaming materials.

In the process, baffles are provided on both sides of the production line track. The baffles determine the width of the sponge. The height of the sponge is determined by the sponge density, the track transmission speed, and the flow rate of the mixed solution.

Example 1

Choose the following materials as the sponge raw materials: for 100 parts by weight of polyols, a modified polyphenyl methane diisocyanate is 61 weight parts; a pore adjusting agent, polysiloxane polyether copolymer, is 2 weight parts; a catalyst, triethylenediamine solution, is 0.2 weight parts; a main water foaming agent is 2.4 weight parts; an auxiliary foaming agent, methylene chloride, is 5 weight parts; and a chain extender, polyether polyol with molecular weight of 100: polyoxyethylene glycol is 4 weight parts.

The above-mentioned 100 parts of polyols consist of the following components in the following proportions: 70 parts of a molecular weight 4800 polyether polyols, 20 parts of a molecular weight 700 polyether polyols, and 10 parts of polymer polyols.

The above-mentioned polyether polyols are a mixture of a variety of high molecular weight polyether polyols. In this example, the polyether polyol with a molecular weight of 4800 is polyoxypropylene trihydroxy ether; the polyether polyol with a molecular weight of 700 is polyoxypropylene glycerol alcohol, and polymer polyol is a highly active graft polyether.

The above-mentioned raw materials are mixed at a temperature of 22-25° C. to form a mixed solution, and the mixed solution is distributed in an oven having a width of 2 meters, using a distributor, at a flow rate of 215 kg/s. The track moves forward at a transmission speed of 3.5 meters in the oven at a temperature of 30-40° C. A continuous big block of sponge with a density of 40 D and a height of 78 cm is formed.

The sponge produced by the process is assessed according to the standard of GBIT2445 1-2009, "slow rebound soft polyurethane foam plastic." (note: because there is no assessment standard for this particular product, this product is temporarily assessed using this standard). The assessment results are as follows:

| testing item | unit | Sample test value |
| --- | --- | --- |
| recovery time | S | 10.3 |
| 75% compression permanent deformation | % | 64.9 |
| rebound degree | % | 10 |
| tensile strength | KPa | 43.3 |
| percentage of elongation | % | 258.1 |
| tear strength | N/cm | 1.01 |
| odor level | level | 3.0 |
| tensile strength rate of change after dry heat aging | % | 16.2 |
| tensile strength rate of change after wet heat aging | % | 3.2 |
| 65% 25% indentation ratio | — | 2.6 |
| 40% indentation hardness value of the loss after constant load repeated indentation fatigue | % | 4.0 |
| temperature and humidity sensitivity | — | 2.2 |

The above table can be summarized as: in the above-mentioned conditions, parameters such as tear strength of the example product are basically similar to those of the standard GBIT2445 1-2009 "slow rebound soft polyurethane foam plastic." Therefore, the produced product meets the standard.

Using the production line mode of a flat foam foaming process, the support resilience is consistent with the ordinary sponge support resilience. The body of the sponge does not collapse. The advantages are: as compared with the conventional injection molding process, the speed of production increases at least 100 folds. The follow-up shaping of the products can be achieved by different shapes of cutting. This can produce products in a myriad of shapes, which can be any shapes that we can imagine. Using cutting to shape the products not only saves raw materials, but also greatly reduces the costs of molds. The economic benefits are significant.

Example 2

Choose the following materials as the sponge raw materials: for 100 parts of polyols, modified polyphenyl methane diisocyanate is 53 parts; the pore adjusting agent, polysiloxane polyether copolymer, is 2 parts; the catalyst, triethylenediamine solution, is 0.18 parts; the main water foaming agent is 2.3 parts; the auxiliary foaming agent, methylene chloride, is 2 parts; the chain extender, and the polyether polyol with a molecular weight of 100, polyoxyethylene glycol, is 3 parts. The above-mentioned 100 parts of polyols consist of the following components in the following proportions: 75 parts of a molecular weight 4800 polyether polyols, 15 parts of a molecular weight 700 polyether polyols, and 10 parts of polymer polyols.

The above-mentioned polyether polyols are a mixture of a variety of high molecular weight polyether polyols. In this example, the polyether polyol with a molecular weight of 4800 is polyoxypropylene trihydroxy ether; the polyether polyol with a molecular weight of 700 is polyoxypropylene glycerol alcohol, and the polymer polyol is a highly active graft polyether.

The above-mentioned raw materials are mixed at a temperature of 22-25° C. to form a mixed solution, and the mixed solution is distributed, using a distributor, in an oven having a width of 2 meters at a flow rate of 250 kg/min. The track moves forward at a transmission speed of 3.5 meters in the oven at a temperature of 30-40° C. A continuous big block of sponge with a density of 46 D and a height of 78 cm is formed in the production line flat foam foaming process.

| testing item | unit | Sample test value |
| --- | --- | --- |
| recovery time | S | 10.3 |
| 75% compression permanent deformation | % | 48.9 |
| rebound degree | % | 10 |
| tensile strength | KPa | 51 |
| percentage of elongation | % | 258.1 |
| tear strength | N/cm | 1.4 |
| odor level | level | 3.0 |
| tensile strength rate of change after dry heat aging | % | 16.2 |
| tensile strength rate of change after wet heat aging | % | 3.2 |
| 65% 25% indentation ratio | — | 2.6 |
| 40% indentation hardness value of the loss after constant load repeated indentation fatigue | % | 4.0 |
| temperature and humidity sensitivity | — | 2.2 |

The above table can be summarized as: under the above-mentioned conditions, parameters, such as the tear strength, of the example product of the invention is basically similar to those of the standard GBIT24.451-2009, "slow rebound soft polyurethane foam plastic." Therefore, the produced product meets the standard Example 3

Choose the following materials as the sponge raw materials: for 100 parts of polyols, the modified polyphenyl methane diisocyanate is 50 parts; the gore adjusting agent, polysiloxane polyether copolymer, is 1.8 parts; the catalyst, triethylenediamine solution, is 0.18 parts; the main water foaming agent is 2.3 parts; and the chain extender polyether polyol, polyoxyethylene glycol, is 2 parts.

The above-mentioned 100 parts of polyols consist of the following components in the following proportions: 80 parts of a molecular weight 4800 polyether polyols, 10 parts of a molecular weight 700 polyether polyols, and 10 parts of polymer polyols.

The above-mentioned polyether polyols are a of a variety of high molecular weight polyether polyols. In this example, the polyether polyol with a molecular weight of 4800 is polyoxypropylene trihydroxy ether; the polyether polyol with a molecular weight of 700 is polyoxypropylene glycerol alcohol, and the polymer polyol is a highly active graft polyether.

The above-mentioned raw materials are mixed at a temperature of 22-25° C. to form a mixed solution, and the mixed solution is distributed, using a distributor, in an oven having a width of 2 meters at a flow rate of 250 kg/min. The track moves forward at a transmission speed of 3.3 meters in the oven at a temperature of 30-40° C. A continuous big block of sponge with a density of 50 D and a height of 76 cm is formed in the production line flat foam foaming process.

The sponge produced by the process, is assessed according to the standard GB1T24451-2009 "slow rebound soft polyurethane foam plastic" (note: because there is no assessment standard for this particular product, this product is temporarily assessed using this standard). The assessment results are as follows:

| testing item | unit | Sample test value |
| --- | --- | --- |
| recovery time | S | 12 |
| 75% compression permanent deformation | % | 55.3 |
| rebound degree | % | 10 |
| tensile strength | KPa | 50 |
| percentage of elongation | % | 258.1 |
| tear strength | N/cm | 1.08 |
| odor level | level | 3.0 |
| tensile strength rate of change after dry heat aging | % | 16.2 |
| tensile strength rate of change after wet heat aging | % | 3.2 |
| 65% 25% indentation ratio | — | 2.6 |
| 40% indentation hardness value of the loss after constant load repeated indentation fatigue | % | 4.0 |
| temperature and humidity sensitivity | — | 2.1 |

The above table can be summarized as: under the above conditions, parameters, such as the tear strength, of the example product of the invention are basically similar to those of the standard GB1T2445 1-2009 "slow rebound soft polyurethane foam plastic." Therefore, the produced product meets the standard.

Example 4

Choose the following materials as the sponge raw materials: for 100 parts of polyols, the modified polyphenyl methane diisocyanate is 52 parts; the pore adjusting agent, polysiloxane polyether copolymer, is 1.6 parts; the catalyst, triethylenediamine solution, is 0.16 parts; the main water foaming agent is 2.1 parts; and the chain extender, polyether polyol, is 5 parts. The above-mentioned 100 parts of polyols consist of the following components in the following proportions: 60 parts of a molecular weight 4800 polyether polyols, 20 parts of a molecular weight 700 polyether polyols, and 20 parts of polymer polyols.

The above-mentioned polyether polyols are a mixture of a variety of high molecular weight polyether polyols. In this example, the polyether polyol with a molecular weight of 4800 is polyoxypropylene trihydroxy ether; the polyether polyol with a molecular weight of 700 is polyoxypropylene glycerol alcohol, and the polymer polyol is a highly active graft polyether.

The above-mentioned raw materials are mixed at a temperature of 22-25° C. to form a mixed solution, and the mixed solution is distributed, using a distributor, in an oven having a width of 2 meters at a flow rate of 285 kg/min. The track moves forward at a transmission speed of 3.5 meters in the oven at a temperature of 30-40° C. A continuous big block of sponge with a density of 55 D and a height of 74 cm is formed.

The process for the production of sponge, according to GB/T2445 1-2009 "slow rebound polyurethane foam" standards for assessed (note: because the particular product has no assessment standard, it is temporarily assessed using this standard assay). The assessment results are as follows:

| testing item | unit | Sample test value |
| --- | --- | --- |
| recovery time | S | 11 |
| 75% compression permanent deformation | % | 60.2 |
| rebound degree | % | 10 |
| tensile strength | KPa | 43.3 |
| percentage of elongation | % | 247.3 |
| tear strength | N/cm | 1.2 |
| odor level | level | 3.0 |
| tensile strength rate of change after dry heat aging | % | 16.2 |
| tensile strength rate of change after wet heat aging | % | 3.2 |
| 65% 25% indentation ratio | — | 2.6 |
| 40% indentation hardness value of the loss after constant load repeated indentation fatigue | % | 5.0 |
| temperature and humidity sensitivity | — | 2.2 |

The above table can be summarized as: under the above conditions, parameters, such as the tear strength, of the example product are basically similar to those of the standard GBiT24451-2009 "slow rebound soft polyurethane foam plastic." Therefore, the produced product meets the standard.

The invention claimed is:

1. A methylene diphenyl diisocyanate (MDI) system-based, non-temperature sensitive memory sponge, made by reacting a polyol mixture, which comprises a polyether polyol and a polymer polyol, with an isocyanate and an auxiliary agent mixture comprising: a foaming agent, a pore adjusting agent, and a catalyst, wherein said polyether polyol is polyoxypropylene glycerol with a molecular weight of 700, wherein said polymer polyol is a graft polyether, and wherein said isocyanate is methylene diphenyl diisocyanate,
wherein the polyol mixture further comprises a polyoxypropylene trihydroxy ether with a molecular weight of 4800, wherein the auxiliary agent mixture further comprises a polyol chain extender,
wherein a weight portion of the foaming agent is 1.5-3 parts by weight per 100 parts by weight of the polyol mixture.

2. The MDI system-based, non-temperature sensitive memory sponge according to claim 1, wherein said polyol chain extender is a polyether polyol with a molecular weight of 100.

3. The MDI system-based, non-temperature sensitive memory sponge according to claim 1, wherein an amount of said polyoxypropylene trihydroxy ether with a molecular weight of 4800 is 60-80%, based on a weight of the polyol mixture; and the weight portion of the polyol chain extender is 2-5%, based on the weight of the polyol mixture.

4. The MDI system-based, non-temperature sensitive memory sponge according to claim 1, wherein said polyol chain extender is a polyoxyethylene glycol.

5. A methylene diphenyl diisocyanate (MDI) system-based, non-temperature sensitive memory sponge, wherein the MDI is prepared by reacting a polyol mixture with methylene diphenyl diisocyanate and an auxiliary agent mixture that comprises: a foaming agent, a pore adjusting agent, a catalyst, and polyol chain extender; wherein the polyol mixture comprises a polyoxypropylene glycerol with a molecular weight of 700, a polyoxypropylene trihydroxy ether with a molecular weight of 4800, and a polymer polyol.

6. The MDI system-based, non-temperature sensitive memory sponge according to claim 5, wherein based on 100 weight parts of the polyol mixture, the weight portion of the polyoxypropylene glycerol with a molecular weight of 700 is 10-20 parts, the weight portion of the polymer polyol is 5-20 parts, the weight portion of the polyoxypropylene trihydroxy ether with a molecular weight of 4800 is 60-80 parts, and the portion weight of methylene diphenyl diisocyanate is 40-70 parts.

7. The MDI system-based, non-temperature sensitive memory sponge according to claim 6, wherein the polyol chain extender is polyoxyethylene glycol and wherein the weight portion of the polyol chain extender is 2-5 parts based on 100 weight parts of the polyol mixture.

8. The MDI system-based, non-temperature sensitive memory sponge according to claim 7, wherein the weight portion of the pore adjusting agent is 1.4-2.5 parts based on 100 weight parts of the polyol mixture, the weight portion of the catalyst is 0.1-0.4 parts based on 100 weight parts of the polyol mixture, and the weight portion of the foaming agent is 1.5-2.5 parts based on 100 weight parts of the polyol mixture.

* * * * *